J. J. GREENOUGH.

Apparatus for Grooming Horses.

No. 5,589. Reissued Oct. 7, 1873.

Attest:
M. Gardner
H. L. Perrine

Inventor:
J. J. Greenough
per
F. A. Lehmann,
atty.

AM. PHOTO-LITHOGRAPHIC Co. N.Y. (OSBORNE'S PROCESS.)

UNITED STATES PATENT OFFICE.

JOHN JAMES GREENOUGH, OF SYRACUSE, NEW YORK.

IMPROVEMENT IN APPARATUS FOR GROOMING HORSES.

Specification forming part of Letters Patent No. 118,449, dated August 29, 1871; reissue No. 5,589, dated October 7, 1873; application filed January 24, 1873.

*To all whom it may concern:*

Be it known that I, JOHN JAMES GREENOUGH, now residing in Syracuse, Onondaga county, New York, have invented certain Improvements in Apparatus for Cleaning and Grooming Horses and other animals, of which the following is a specification:

The object of my invention is to aid and facilitate the manual labor required to properly clean or groom horses and other animals, greatly expediting the process, by which much time and labor are saved, and the animals more perfectly cleaned than by the ordinary way; and it consists of a jointed arm or axes, united by any proper couplings or gearing, connecting the driving power with a revolving cylindrical brush, sponge, rubber, cloth, or other suitable grooming-tool.

The axes or joints of the arm may be of any convenient number, two besides the brush-joint being sufficient for most purposes, and their length is determined by the distance they are required to reach.

Figure 1:
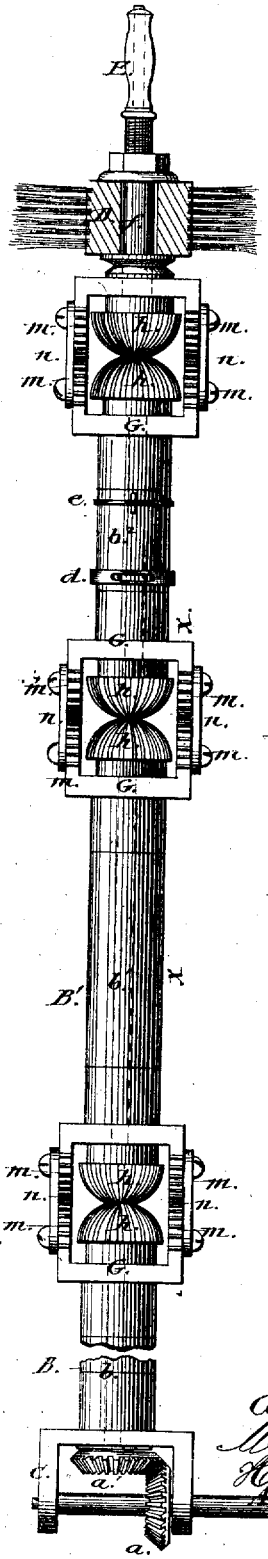
Figure 2:
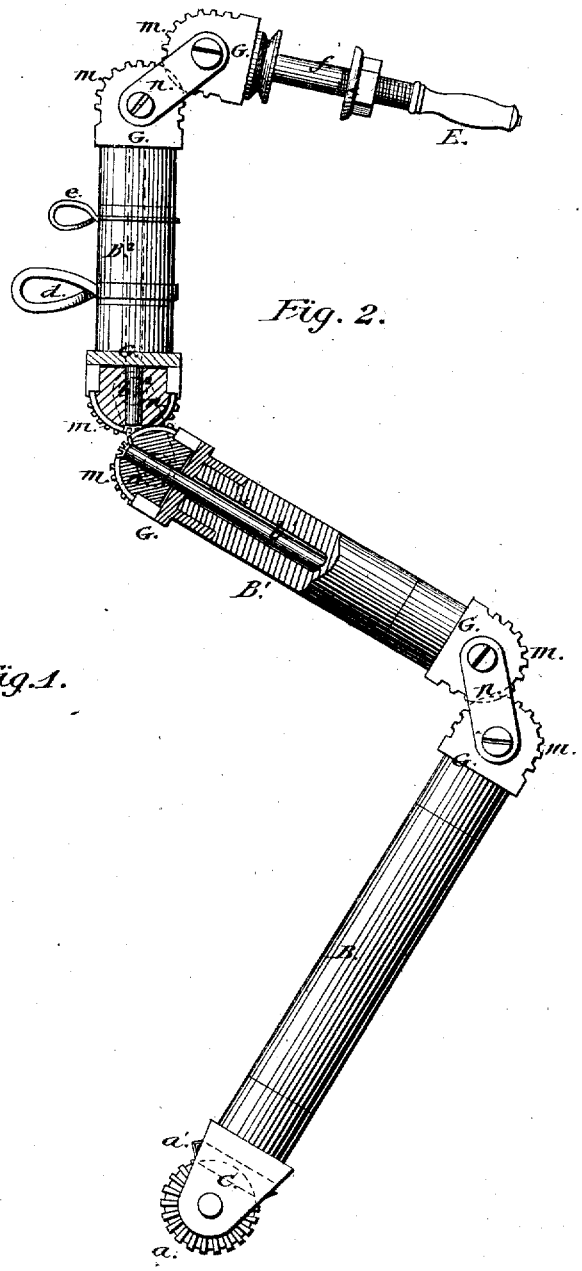

In the accompanying drawing, Figure 1 shows a series of joints extended in a straight line. Fig. 2 represents the joints bent at an angle to each other.

The construction is as follows: A represents a driving-shaft, which may be connected with any mechanical motor or be turned by manual labor, as may be most convenient. This is supported, properly, in any way well known to machinists. The first joint of the arm B is pivoted to this shaft by lugs C. It is made tubular throughout its whole length, and an axis, *b*, extends through it. (Shown by dotted lines.) Said axis revolves in bearings at either end of the joint B, that does not revolve with it. On the driving-shaft A there is a bevel-wheel, *a*, which gears into a bevel-pinion, *a'*, on the axis *b*, and drives it.

The axis may be speeded up at this point by making pinion *a'* smaller than *a;* or they can be of the same size, as seen in the drawing, and run at the same speed.

Joint B is jointed at its opposite end G to joint $B^1$, and the axes $b$ $b^1$ are geared together in any known and convenient way that is found efficient; but I prefer to unite them by my globe-gear or universal joint, as more fully described in my specification for patent therefor, now before the Patent Office, but herein roughly delineated, consisting of segments *m m* united by links *n*, inclosing hemispherical gear *h h*, affixed to said shafts $b$ $b^1$. The other ends of $B^1$ $b^1$ are jointed, in like manner, to $B^2$ $b^2$, and the latter to the axis of the brush-spindle *f;* or, the brush-spindle may be jointed to $B^1$.

The brush-spindle *f*, on which the brush or other working-tool is affixed by any well-known catch that will allow it to be removed, is furnished with a handle, E, in which it loosely revolves. This handle is held in the hand of the operator, to guide and hold the brush in proper position to work.

This handle may be placed beyond the brush D or other working-tool, or between the brush and the joint, giving the operator full power to guide and direct the tool over every part of the animal within range of the arms.

The couplings and gearing of the joints may be covered with short flexible tubes, or other proper flexible covering, that will allow freedom of action and exclude dirt.

I can attach to the handle a shield to cover the brush, and direct the dust from the operator or animal.

The joint $B^2$ may be furnished with a loop or ring, *d*, to pass the arm of the operator through, with a handle, *e*, to hold in the hand; or they may be dispensed with and the joint $B^2$ held in the hand, if necessary.

It is obvious that the arms B, $B^2$, &c., covering the revolving axes, may in some cases be omitted without changing the invention.

Having thus fully described my improved grooming apparatus, I claim—

A grooming-machine whose main driving-wheel, or shaft to which the motor is applied, is connected to the brush by means of a jointed revolving rod or shaft, constructed of such parts and proportions as to permit the tool to be applied readily to the animal, as set forth.

JOHN JAMES GREENOUGH.

Witnesses:
THOMAS C. CONNOLLY,
HENRY H. BARTON.